(12) United States Patent
Skinner (10) Patent No.: US 7,072,588 B2
(45) Date of Patent: Jul. 4, 2006

(54) MULTIPLEXED DISTRIBUTION OF OPTICAL POWER

(75) Inventor: Neal G. Skinner, Lewisville, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 682 days.

(21) Appl. No.: 09/932,639

(22) Filed: Aug. 17, 2001

(65) Prior Publication Data

US 2002/0039465 A1  Apr. 4, 2002

(30) Foreign Application Priority Data

Oct. 3, 2000  (US) ..................... PCT/US00/27279

(51) Int. Cl.
*H04B 10/00* (2006.01)
*H04J 14/02* (2006.01)

(52) U.S. Cl. ................. 398/171; 398/151; 398/85; 398/84; 398/82

(58) Field of Classification Search .............. 359/168, 359/170, 171, 144; 340/854.7, 854.9; 398/171, 398/151, 84, 85, 82
See application file for complete search history.

(56) References Cited

U.S. PATENT DOCUMENTS

| | | | | |
|---|---|---|---|---|
| 4,182,935 A | * | 1/1980 | Chown | 179/15 |
| 4,346,478 A | * | 8/1982 | Sichling | 455/612 |
| 4,495,421 A | * | 1/1985 | Endo et al. | 250/551 |
| 4,928,319 A | * | 5/1990 | Pitt et al. | 398/171 |
| 4,941,201 A | * | 7/1990 | Davis | 455/41.2 |
| 5,033,112 A | * | 7/1991 | Bowling et al. | 455/603 |
| 5,077,816 A | * | 12/1991 | Glomb et al. | 385/37 |
| 5,193,201 A | * | 3/1993 | Tymes | 708/191 |
| 5,272,350 A | | 12/1993 | Solari et al. | |
| 5,315,110 A | | 5/1994 | Smith | |
| 5,502,589 A | | 3/1996 | Yamamoto et al. | |
| 5,502,783 A | * | 3/1996 | Wu | 385/42 |
| 5,612,805 A | * | 3/1997 | Fevrier et al. | 359/124 |
| 5,627,925 A | * | 5/1997 | Alferness et al. | 385/17 |
| 5,677,781 A | * | 10/1997 | Mori et al. | 359/179 |
| 5,859,719 A | | 1/1999 | Dentai et al. | |
| 5,907,420 A | * | 5/1999 | Chraplyvy et al. | 359/179 |
| 6,005,996 A | | 12/1999 | Webb | |
| 6,025,948 A | * | 2/2000 | Gautheron | 359/177 |
| 6,034,799 A | * | 3/2000 | Hansen | 359/124 |
| 6,038,357 A | * | 3/2000 | Pan | 385/24 |
| 6,075,628 A | * | 6/2000 | Fisher et al. | 359/110 |
| 6,115,156 A | * | 9/2000 | Otani et al. | 359/124 |
| 6,271,766 B1 | * | 8/2001 | Didden et al. | 340/853.1 |
| 6,351,323 B1 | * | 2/2002 | Onaka et al. | 359/187 |
| 6,433,904 B1 | * | 8/2002 | Swanson et al. | 359/133 |

FOREIGN PATENT DOCUMENTS

WO  WO 00/77932 A2  12/2000

OTHER PUBLICATIONS

International Search Report Application No.: PCT/US00/27279.

* cited by examiner

*Primary Examiner*—M. R. Sedighian
(74) *Attorney, Agent, or Firm*—Marlin R. Smith (57) ABSTRACT

An optical power distribution system and method permits multiple power consuming devices to be selectively supplied with power using a single fiber optic line. In a described embodiment, multiple electrical power consuming well tools are interconnected to a fiber optic line extending into a well. Control modules are interconnected between the fiber optic line and the well tools. When a particular optical wavelength band is transmitted through the fiber optic line, a corresponding one of the control modules causes the respective well tool to be selected for electrical power to be supplied thereto.

25 Claims, 5 Drawing Sheets

MULTIPLEXED DISTRIBUTION OF OPTICAL POWER

CROSS-REFERENCE TO RELATED APPLICATION

This application claims the benefit under 35 USC §119 of the filing date of international application PCT/US00/27279, filed Oct. 3, 2000, the disclosure of which is incorporated herein by this reference.

BACKGROUND

The present invention relates generally to operations performed and equipment utilized in conjunction with a subterranean well and, in an embodiment described herein, more particularly provides a system whereby multiple well tools are powered via a single optical fiber.

Many methods have been used in the past for selectively powering remote devices, such as well tools. For example, hydraulic lines may be run from a remote location to the well tools. Where it is desired to supply electrical power to the well tools, electrical lines may be run to the well tools. Separate electrical lines may be run to each of the well tools, or the same electrical lines may be run to each of the well tools, with signals on the lines being used to select from among the well tools for operation thereof.

In one recently developed method, an opto-electric converter is interconnected between a fiber optic line and a well tool. When light is transmitted through the fiber optic line, the opto-electric converter converts the light to electrical power, which is supplied to the well tool. For multiple well tools, a separate fiber optic line and opto-electric converter is required for each well tool. A particular well tool is selected by transmitting light through the corresponding one of the multiple fiber optic lines.

It would, however, be far preferable to be able to use a single fiber optic line to select from among multiple well tools for supplying electrical power thereto. This would reduce the number of fiber optic lines which must be installed in a well to individually control or power multiple devices. Furthermore, it would be advantageous to be able to use the same fiber optic line used to control or power multiple devices to also sense a parameter in a well.

SUMMARY

In carrying out the principles of the present invention, in accordance with an embodiment thereof, a method of providing electrical power to multiple power consuming devices is provided which solves the above problem in the art. An electrical power distribution system and a method of combining multiplexed power distribution with sensing are also provided.

In one aspect of the invention, a fiber optic line is connected to multiple power consuming devices. Optical wavelength bands are transmitted through the fiber optic line to select from among the multiple power consuming devices. For example, one optical wavelength band transmitted through the fiber optic line may cause a corresponding one of the power consuming devices to be selected, while another optical wavelength band transmitted through the fiber optic line may cause another one of the power consuming devices to be selected.

In another aspect of the invention, control modules may be used to perform the selection function, that is, to respond to the optical wavelength bands transmitted through the fiber optic line. A control module may be interconnected between the fiber optic line and each of the power consuming devices. When a particular optical wavelength band is transmitted through the fiber optic line, the corresponding control module causes the associated power consuming device to be selected.

In yet another aspect of the invention, an opto-electric converter may be interconnected between each of the control modules and its corresponding power consuming device. When the control module causes the power consuming device to be selected in response to an appropriate optical wavelength band being transmitted through the fiber optic line, light from the fiber optic line is transmitted to the opto-electric converter and electrical power is thereby supplied to the power consuming device.

In a further aspect of the invention, multiple optical wavelength bands may be transmitted simultaneously through the fiber optic line to thereby simultaneously select multiple ones of the power consuming devices for supplying electrical power thereto. This may be accomplished by separately generating the multiple optical wavelength bands and then using an optical coupler to combine them for transmission through the fiber optic line, or by generating a relatively wide optical wavelength band and using filters to select the narrower wavelength bands to be transmitted through the fiber optic line.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
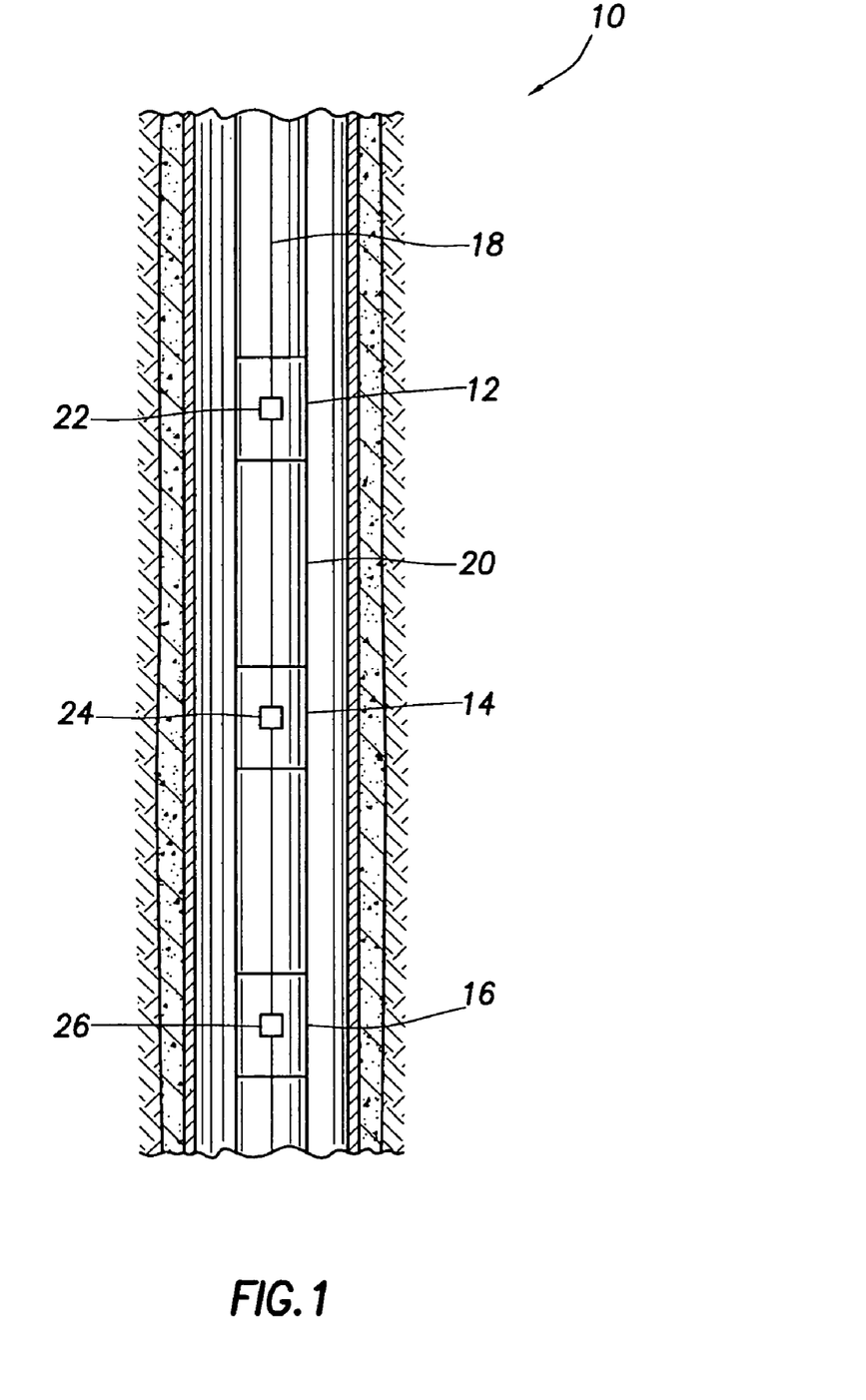
FIG. 1 is a schematic view of a method embodying principles of the present invention.

Representatively illustrated in FIG. 1 is a method 10 which embodies principles of the present invention. In the following description of the method 10 and other apparatus and methods described herein, directional terms, such as "above", "below", "upper", "lower", etc., are used only for convenience in referring to the accompanying drawings. Additionally, it is to be understood that the various embodiments of the present invention described herein maybe utilized in various orientations, such as inclined, inverted, horizontal, vertical, etc., and in various configurations, without departing from the principles of the present invention.

In the method 10 as depicted in FIG. 1, multiple well tools 12, 14, 16 are positioned in a well and are each interconnected to a fiber optic line 18. Preferably, although not necessarily, the fiber optic line 18 comprises a single mode optical fiber. The well tools 12, 14, 16 may be any type of electrical power consuming devices, such as sensors, valves, etc. which are electrically actuated, excited or otherwise powered. The well tools 12, 14, 16 are shown as being spaced apart longitudinally in a tubing string 20, but it is to be clearly understood that the well tools may be integrated into a single apparatus, may be otherwise positioned in a well, etc., without departing from the principles of the present invention. For example, a single apparatus may have multiple electrical actuators, and each of the actuators may be considered to be an electrical power consuming device represented by one of the well tools 12, 14, 16 in the method 10. As another example, the well tools 12, 14, 16 may be positioned in a well without the use of the tubing string 20, such as by attaching the well tools to casing, or suspending them from a wireline, etc.

Control modules 22, 24, 26 are interconnected to the fiber optic line 18 and to the well tools 12, 14, 16. Each of the control modules 22, 24, 26 is connected between the fiber optic line 18 and one of the well tools 12, 14, 16 to thereby permit electrical power to be selectively supplied to the well tools. Each of the control modules 22, 24, 26 is configured so that, when a particular optical wavelength band is transmitted through the fiber optic line 18, the control module causes the corresponding well tool 12, 14, 16 to be selected for supplying electrical power thereto. Thus, by transmitting a particular optical wavelength band through the fiber optic line 18, electrical power may be supplied to a particular one of the well tools 12, 14, 16, and by transmitting a different optical wavelength band through the fiber optic line, electrical power may be supplied to a different one of the well tools.

If desired, the control modules 22, 24, 26 may be configured so that multiple ones of the well tools 12, 14, 16 may be selected when a particular optical wavelength band is transmitted through the fiber optic line 18. Furthermore, multiple optical wavelength bands may be simultaneously transmitted through the fiber optic line 18 to thereby simultaneously supply electrical power to multiple ones of the well tools 12, 14, 16.

Figure 2:
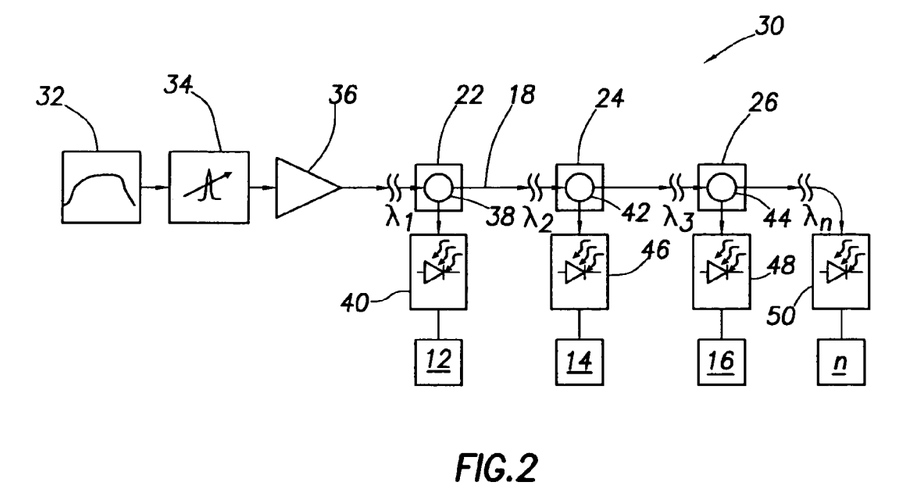
FIG. 2 is a schematic block diagram of a first optical power distribution system embodying principles of the present invention, the system being usable in the method of FIG. 1.

Referring additionally now to FIG. 2, an electrical power distribution system 30 embodying principles of the present invention is representatively illustrated. The system 30 is described below as if it is used in the method 10 to optically control the distribution of electrical power to the well tools 12, 14, 16, but it is to be clearly understood that the principles of the invention may be incorporated into many other methods.

In the system 30, a light source 32 generates a relatively broad optical wavelength band. The broad optical wavelength band is transmitted through a tunable filter 34 to thereby select a narrower desired optical wavelength band. This relatively narrow optical wavelength band corresponds to one or more of the control modules 22, 24, 26 to select the corresponding well tool(s) 12, 14, 16 for supplying electrical power thereto. The optical wavelength band output from the filter 34 may be amplified by an optional amplifier 36, such as an erbium doped fiber amplifier, if desired to increase the intensity of the output, before being transmitted through the fiber optic line 18.

The control module 22 includes a wavelength division multiplexing (WDM) drop 38 interconnected to the fiber optic line 18. The WDM drop 38 is responsive to a certain optical wavelength band $\lambda 1$. When the optical wavelength band $\lambda 1$ is transmitted through the fiber optic line 18, the WDM drop 38 directs light from the fiber optic line to an opto-electric converter 40 interconnected between the control module 22 and the well tool 12. All wavelengths other than the optical wavelength band $\lambda 1$ pass through the WDM drop 38 unaffected.

The opto-electric converter 40 converts the light to electrical power, thereby supplying electrical power to the well tool 12. Any type of opto-electric converter may be used, for example, a photo diode, photoelectric converter, etc.

Similarly, the control module 24 includes a WDM drop 42 responsive to an optical wavelength band $\lambda 2$, and the control module 26 includes a WDM drop 44 responsive to an optical wavelength band $\lambda 3$. An opto-electric converter 46 is interconnected between the control module 24 and the well tool 14, and an opto-electric converter 48 is interconnected between the control module 26 and the well tool 16. Thus, any of the well tools 12, 14, 16 may be selectively supplied with electrical power by transmitting the corresponding optical wavelength band $\lambda 1$, $\lambda 2$, $\lambda 3$ through the fiber optic line 18.

Note, also that an additional one or more well tools n may be supplied with electrical power by transmitting any optical wavelength bands $\lambda n$ through the fiber optic line 18 other than, or in addition to, the optical wavelength bands $\lambda 1$, $\lambda 2$, $\lambda 3$ used to select the well tools 12, 14, 16. An opto-electric converter 50 converts light transmitted through the fiber optic line 18, other than in the optical wavelength bands $\lambda 1$, $\lambda 2$, $\lambda 3$, to electrical power for the well tool n. Thus, no WDM drop is needed to supply power to the one or more additional well tools n.

Figure 3:
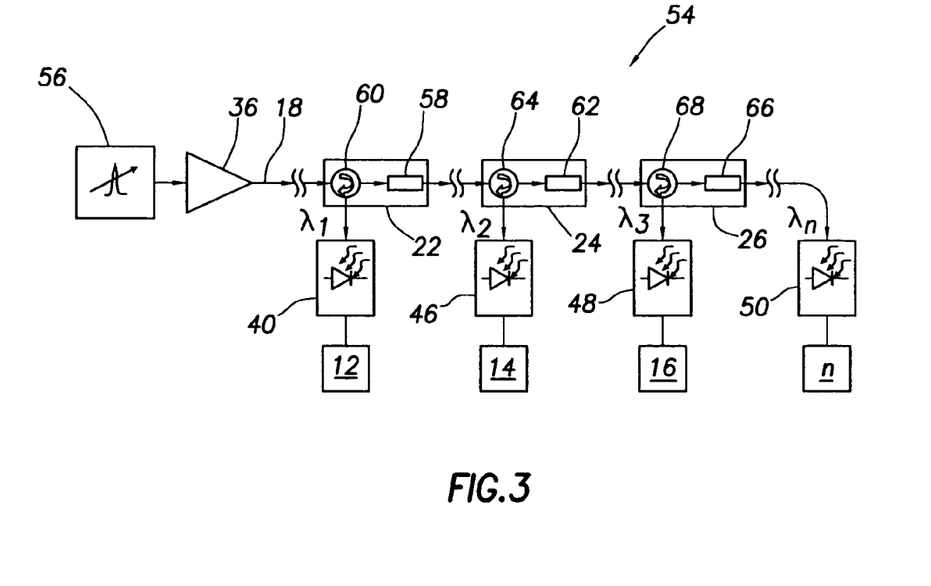
FIG. 3 is a schematic block diagram of a second optical power distribution system embodying principles of the present invention, the system being usable in the method of FIG. 1.

Referring additionally now to FIG. 3, another electrical power distribution system 54 embodying principles of the present invention is representatively illustrated. The power distribution system 54 depicted in FIG. 3 is similar in many respects to the power distribution system 30 shown in FIG. 2. However, each of the control modules 22, 24, 26 of the system 54 includes a specific type of WDM drop which includes a Bragg grating and an optical circulator. The Bragg gratings are preferably intrinsic fiber Bragg gratings. In addition, instead of the light source 32 and tunable filter 34 of the system 30, the system 54 utilizes a tunable laser 56, that is, a laser which is tunable to output a variable relatively narrow optical wavelength band. Of course, the light source 32 and tunable filter 34 may be substituted for the tunable laser 56, if desired.

The control module 22 includes a Bragg grating 58 which reflects the optical wavelength band $\lambda 1$. If the well tool 12 is to be selected for supply of electrical power thereto, the laser 56 is tuned to output the optical wavelength band λ1, which is amplified and transmitted through the fiber optic line 18. When the optical wavelength band λ1 reaches the Bragg grating 58, it is reflected back to an optical circulator 60. The optical circulator 60 diverts the reflected optical wavelength band λ1 to the opto-electric converter 40, thereby causing electrical power to be supplied to the well tool 12.

Similarly, the control module 24 includes a Bragg grating 62 and optical circulator 64, and the control module 26 includes a Bragg grating 66 and optical circulator 68. The Bragg grating 62 reflects the optical wavelength band λ2 and the Bragg grating 66 reflects the optical wavelength band λ3. Thus, the well tool 14 may be selected for supplying electrical power thereto by transmitting the optical wavelength band λ2 through the fiber optic line 18, and the well tool 16 may be selected for supplying electrical power thereto by transmitting the optical wavelength band λ3 through the fiber optic line. The well tool n, as before, may be selected for supplying electrical power thereto by transmitting an optical wavelength band other than, or in addition to, the optical wavelength bands λ1, λ2, λ3 through the fiber optic line 18.

Figure 4:
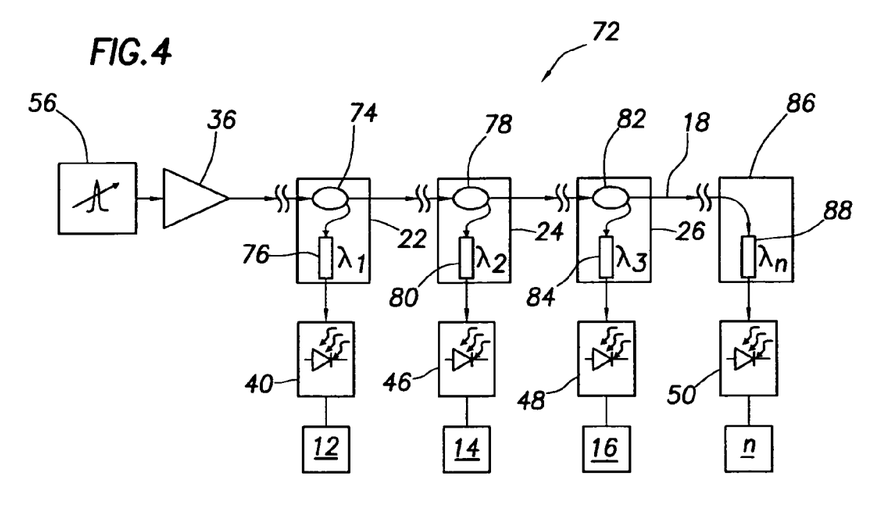
FIG. 4 is a schematic block diagram of a third optical power distribution system embodying principles of the present invention, the system being usable in the method of FIG. 1.

Referring additionally now to FIG. 4, another electrical power distribution system 72 embodying principles of the present invention is representatively illustrated. The system 72 is similar in many respects to the systems 30, 54 described above, but differs in at least one respect in that it does not utilize WDM drops for controlling selection of the well tools 12, 14, 16 for supplying electrical power thereto. Instead, its control modules 22, 24, 26 include optical couplers and optical filters.

The control module 22 includes an optical coupler 74 and an optical filter 76. The coupler 74 diverts a portion of light transmitted through the fiber optic line 18 to the filter 76. The filter 76 permits only the optical wavelength band λ1 to pass therethrough. Light passing through the filter 76 is converted to electrical power by the opto-electric converter 40. Therefore, to select the well tool 12 for supplying electrical power thereto, the laser 56 is tuned to output the optical wavelength band λ1. Of course, the light source 32 and tunable filter 34 may be substituted for the tunable laser 56, if desired.

Similarly, the control module 24 includes an optical coupler 78 and an optical filter 80, and the control module 26 includes an optical coupler 82 and an optical filter 84. The optical filter 80 permits only the optical wavelength band λ2 to pass therethrough, and the optical filter 84 permits only the optical wavelength band λ3 to pass therethrough. The well tool n may be selected for supplying electrical power thereto by transmitting any optical wavelength band through the fiber optic line 18. Alternatively, a control module 86 may be used, which includes an optical filter 88 that permits only a certain optical wavelength band λn to pass therethrough, in which case the well tool n will only be selected if the optical wavelength band λn is transmitted through the fiber optic line 18.

It will be readily appreciated that more than one of the well tools 12, 14, 16, n in the above described systems 30, 54, 72 may be selected by transmitting more than one optical wavelength band through the fiber optic line 18. For example, in the systems 30, 54, 72 if both optical wavelength bands λ1 and λ2 are transmitted through the fiber optic line 18, then electrical power will be supplied to both well tools 12 and 14. This gives an additional level of selectivity in the systems 30, 54, 72 by permitting simultaneous powering of multiple selected well tools.

Figure 5:
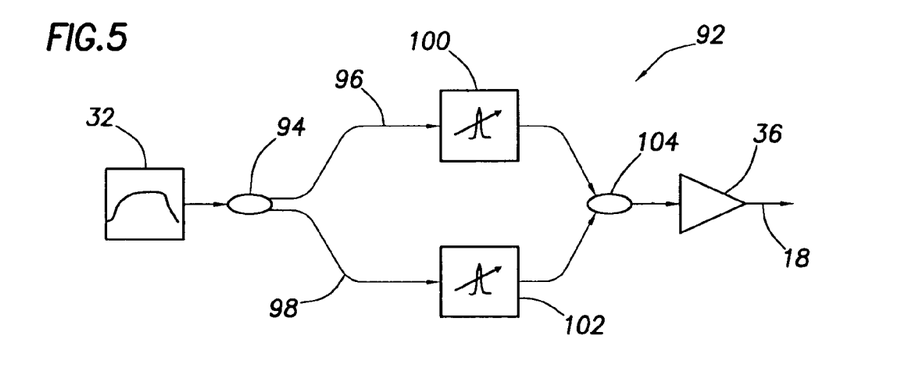
FIG. 5 is a schematic block diagram of a first system whereby multiple optical wavelength bands may be transmitted via a single fiber optic line in the systems of FIGS. 2–4.

Referring additionally now to FIG. 5, a system 92 whereby multiple specific optical wavelength bands may be transmitted simultaneously through the fiber optic line 18 is representatively illustrated. The light source 32, which outputs a relatively broad optical wavelength band, is connected to an optical coupler 94, causing the laser output to be split and transmitted through multiple optical paths 96, 98. Two of the optical paths 96, 98 are depicted in FIG. 5, but it is to be understood that any number of the paths maybe used.

Each of the optical paths 96, 98 has a tunable or fixed wavelength filter 100, 102 interconnected therein. The filters 100, 102 may be independently tuned, or may be selected to pass desired optical wavelength bands, to thereby permit selected optical wavelength bands to pass therethrough. For example, the filter 100 may be tuned or selected to permit only the optical wavelength band λ1 to pass therethrough, and the filter 102 may be tuned or selected to permit only the optical wavelength band λ2 to pass therethrough. Of course, if additional optical paths are utilized, then additional optical filters may be used also.

The outputs of the filters 100, 102 are combined using an optical coupler 104. Thus, the output of the optical coupler 104 is a combination of the optical wavelength bands permitted to pass through the filters 100, 102. This combination of optical wavelength bands is then amplified by the optional amplifier 36, if desired, and transmitted through the fiber optic line 18.

Figure 6:
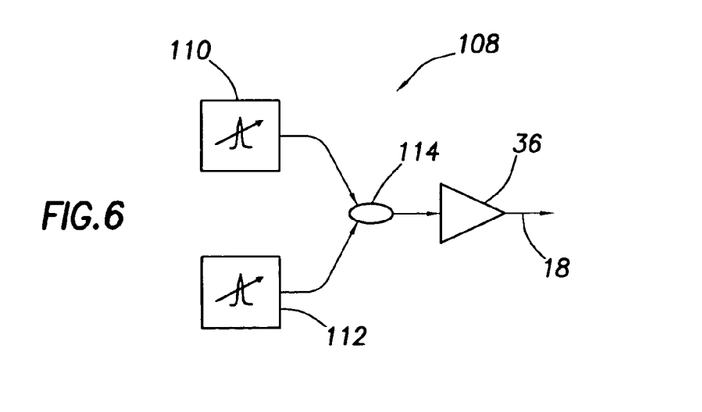
FIG. 6 is a schematic block diagram of a second system whereby multiple optical wavelength bands may be transmitted via a single fiber optic line in the systems of FIGS. 2–4.

Referring additionally now to FIG. 6, another system 108 whereby multiple specific optical wavelength bands may be transmitted simultaneously through the fiber optic line 18 is representatively illustrated. Instead of the relatively broad optical wavelength band light source 32, optical coupler 94 and tunable filters 100, 102 of the system 92 shown in FIG. 5, the system 108 utilizes multiple tunable or fixed wavelength output lasers 110, 112, to produce multiple specific optical wavelength bands.

The lasers 110, 112 are independently tuned or selected to produce individual desired optical wavelength bands. More lasers may be used if it is desired to produce a greater number of separate optical wavelength bands. These optical wavelength bands output by the lasers 110, 112 are combined using an optical coupler 114 and then, if desired, input to the amplifier 36. The optional amplifier 36 amplifies the combined optical wavelength bands, which are then transmitted through the fiber optic line 18.

Either of the systems 92, 108 may be used in any of the electrical power distribution systems 30, 54, 72 described above. These systems 92, 108 demonstrate that various means may be utilized to transmit multiple optical wavelength bands through the fiber optic line 18. Although only two systems 92, 108 in which a single light source 32 and multiple tunable or fixed filters 100, 102, or multiple tunable or fixed lasers 110, 112, are used have been described, it will be readily appreciated that many other systems may be used to transmit multiple optical wavelength bands through the fiber optic line 18. For example, if simultaneous transmission of the optical wavelength bands through the fiber optic line 18 is not desired, a single light source 32 may be used with multiple filters that are switched in and out between the light source and the fiber optic line to thereby select from among corresponding multiple optical wavelength bands.

Figure 7:
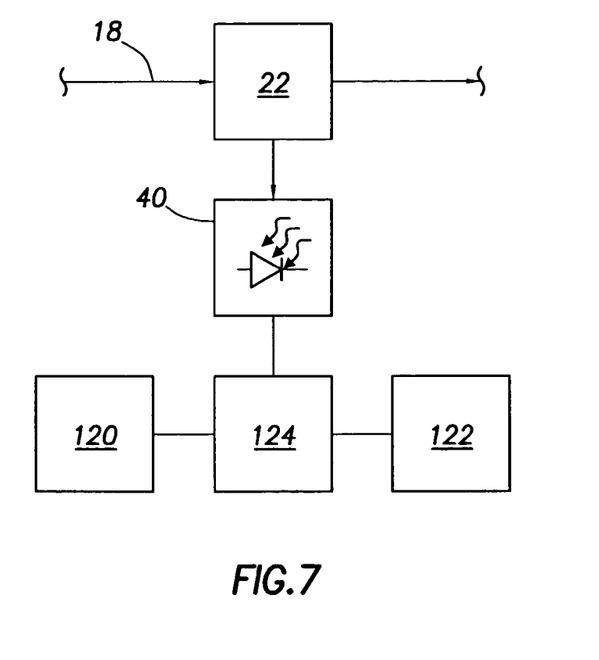
FIG. 7 is a schematic block diagram of a first alternative utilization of distributed optical power which may be incorporated into the distribution systems of FIGS. 2–4.
Figure 8:
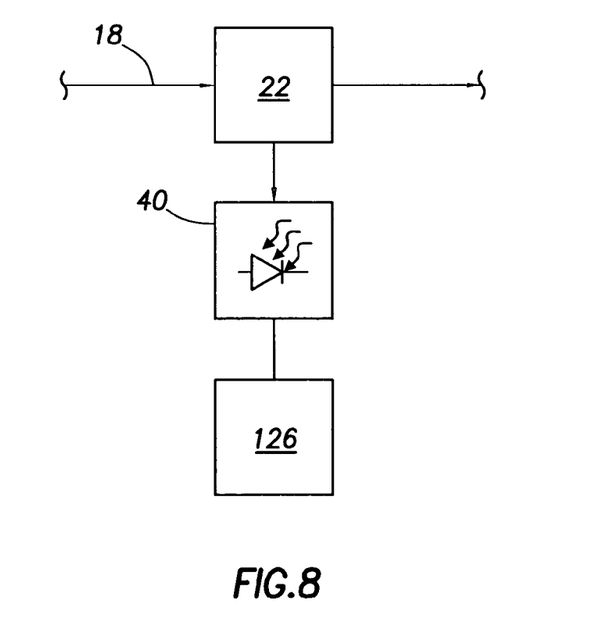
FIG. 8 is a schematic block diagram of a second alternative utilization of distributed optical power which may be incorporated into the distribution systems of FIGS. 2–4.
Figure 9:
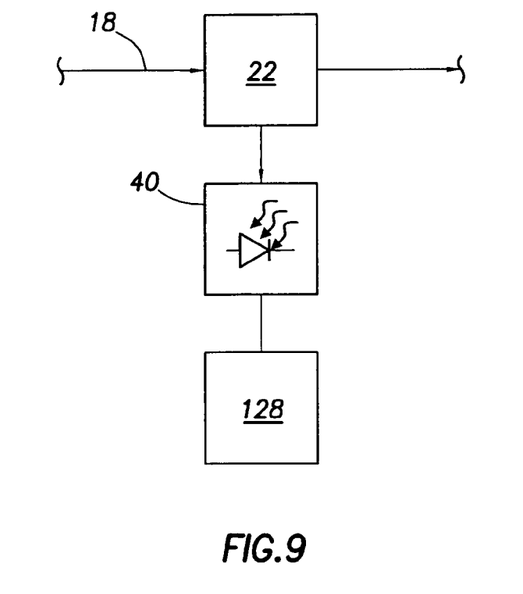
FIG. 9 is a schematic block diagram of a third alternative utilization of distributed optical power which may be incorporated into the distribution systems of FIGS. 2–4.

Referring additionally now to FIGS. 7–9, alternative utilizations of the optical power distributed in the systems 30, 54, 72 described above are representatively and schematically illustrated. Only one of the control modules 22 and associated opto-electric converters 40 are depicted in FIGS. 7–9, it being understood that there are actually multiple control modules 22, 24, 26 and opto-electric converters 40, 46, 48 in the systems 30, 54, 72, and any number of these elements may be incorporated into any number of apparatuses in keeping with the principles of the invention.

In FIG. 7, an electrical output of the opto-electric converter 40 is used to provide an electrical connection between a power source 120, such as a battery, downhole generator, etc., and a power consuming device 122, such as a motor, actuator, etc. Thus, instead of the electrical output of the opto-electric converter 40 being used to directly power a device such as the well tool 12, it is used to actuate an electrical switch 124 interconnected between the power supply 120 and the power consuming device 122. The switch 124 could, for example, be a field effect transistor (FET), or any other type of device capable of providing an electrical connection between the power supply 120 and the power consuming device 122.

In FIG. 8, an electrical output of the opto-electric converter 40 is used to transmit data to a data storage device 126. For example, the optical wavelength band λ1 may be transmitted through the fiber optic line 18 in a manner which causes data to be communicated thereby, such as, by alternately transmitting and not transmitting the optical wavelength band λ1 so that the electrical output of the opto-electric converter 40 is in the form of digital 1's and 0's. This digitally transmitted data may be readily stored in the device 126 using techniques well known to those skilled in the art.

Data in forms other than digital may be transmitted, as well, without departing from the principles of the present invention. For example, data may be transmitted in analog form by varying an intensity or other parameter of the light in the optical wavelength band λ1 transmitted through the fiber optic line 18.

In FIG. 9, an electrical output of the opto-electric converter 40 is used as an input to an electronic device 128, such as a microprocessor. For example, the device 128 may be programmed to perform a certain function when an electrical input is present at a terminal thereof. In this manner, functions of a well tool in addition to supplying power to a device, actuating a device or storing data in a device may be controlled by transmission of the optical wavelength band λ1 through the fiber optic line 18.

Figure 10:
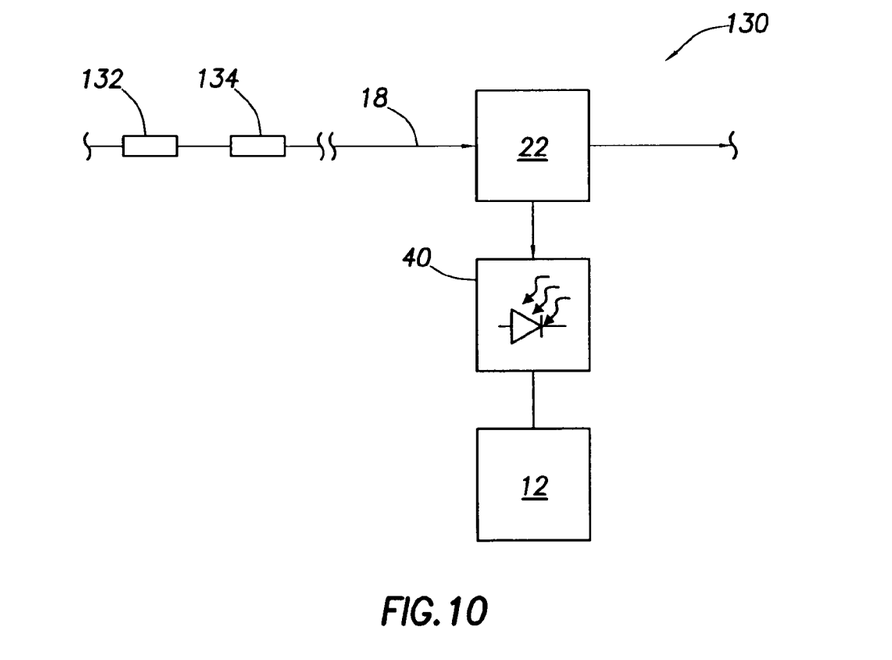
FIG. 10 is a schematic block diagram of a method of incorporating sensors into the distribution systems of FIGS. 2–4.

Referring additionally now to FIG. 10, a method 130 embodying principles of the present invention is representatively and schematically illustrated. Again, only one of the control modules 22 and its associated opto-electric converter 40 is depicted connected to the fiber optic line 18, but it is to be understood that any number of these devices may be used, without departing from the principles of the present invention, such as the multiple control modules 22, 24, 26 and opto-electric converters 40, 46, 48, 50 in the systems 30, 54, 72 described above.

In the method 130, the fiber optic line 18 is used to not only distribute optical power to well tools, such as the well tool 12, but to also permit various parameters to be measured. This result may be accomplished using only a single optical fiber to distribute optical power to multiple well tools and to obtain measurements from multiple sensors.

Specifically, in the method 130 as depicted in FIG. 10, multiple sensors 132, 134 are provided on the fiber optic line 18, in addition to the control modules 22, 24, 26. The sensors 132, 134 may be, for example, intrinsic fiber Bragg grating sensors, well known to those skilled in the art. The sensors 132, 134 may be used to measure temperature, pressure, or any other parameter. Note that other types of sensors may be used for the sensors 132, 134, and other types of parameters may be measured, without departing from the principles of the present invention.

Thus, the method 130 permits the distribution of optical power to multiple well tools 12, 14, 16, n, and the measurement of various parameters via multiple sensors 132, 134, utilizing only a single fiber optic line 18, which may be a single mode fiber optic line.

Of course, a person skilled in the art would, upon a careful consideration of the above description of representative embodiments of the invention, readily appreciate that many modifications, additions, substitutions, deletions, and other changes may be made to the specific embodiments, and such changes are contemplated by the principles of the present invention. Accordingly, the foregoing detailed description is to be clearly understood as being given by way of illustration and example only, the spirit and scope of the present invention being limited solely by the appended claims.

What is claimed is:

1. A method of providing electrical power to multiple power consuming devices, the method comprising the steps of:

interconnecting each of the power consuming devices to a fiber optic line, so that each of the power consuming devices is selectable for operation thereof by transmitting one of multiple optical wavelength bands through the fiber optic line, and wherein each of the transmitted optical wavelength bands causes a respective at least one of the power consuming devices to be selected; and transmitting various of the optical wavelength bands through the fiber optic line, thereby supplying electrical power to corresponding selected ones of the power consuming devices, the transmitting step further comprising simultaneously transmitting multiple ones of the optical wavelength bands through the fiber optic line, thereby selecting corresponding multiple ones of the power consuming devices for operation thereof, the multiple optical wavelength bands being transmitted through the fiber optic line by interconnecting a first optical coupler to the fiber optic line, the first optical coupler receiving separate optical wavelength bands from multiple tunable filters.

2. The method according to claim 1, wherein each of the tunable filters is interconnected between the first optical coupler and a second optical coupler, each of the tunable filters receiving a relatively broad optical wavelength band from the second optical coupler.

3. A method of providing electrical power to multiple power consuming devices, the method comprising the steps of:

interconnecting each of the power consuming devices to a fiber optic line, so that each of the power consuming devices is selectable for operation thereof by transmitting one of multiple optical wavelength bands through the fiber optic line, and wherein each of the transmitted optical wavelength bands causes a respective at least one of the power consuming devices to be selected; and transmitting various of the optical wavelength bands through the fiber optic line, thereby supplying electrical power to corresponding selected ones of the power consuming devices, the transmitting step further comprising simultaneously transmitting multiple ones of the optical wavelength bands through the fiber optic line, thereby selecting corresponding multiple ones of the power consuming devices for operation thereof, the multiple optical wavelength bands being transmitted through the fiber optic line by interconnecting an optical coupler to the fiber optic line, the optical coupler receiving separate optical wavelength bands from respective multiple tunable lasers.

4. An electrical power distribution system, comprising:
a fiber optic line;
multiple power consuming devices;
multiple control modules interconnected between the fiber optic line and the power consuming devices, each of the control modules being interconnected between the fiber optic line and one of the power consuming devices, and each of the control modules being operative to select the respective power consuming device for supplying electrical power thereto in response to one of multiple optical wavelength bands transmitted through the fiber optic line, each of the optical wavelength bands causing one of the control modules to select the respective power consuming device for supplying electrical power thereto; and
multiple tunable filters and a first optical coupler interconnected to the fiber optic line, the first optical coupler receiving separate optical wavelength bands from the multiple tunable filters.

5. The system according to claim 4, wherein each of the tunable filters is interconnected between the first optical coupler and a second optical coupler, each of the tunable filters receiving a relatively broad optical wavelength band from the second optical coupler.

6. An electrical power distribution system, comprising:
a fiber optic line;
multiple power consuming devices;
multiple control modules interconnected between the fiber optic line and the power consuming devices, each of the control modules being interconnected between the fiber optic line and one of the power consuming devices, and each of the control modules being operative to select the respective power consuming device for supplying electrical power thereto in response to one of multiple optical wavelength bands transmitted through the fiber optic line, each of the optical wavelength bands causing one of the control modules to select the respective power consuming device for supplying electrical power thereto, the multiple optical wavelength bands being transmitted simultaneously through the fiber optic line; and
an optical coupler interconnected to the fiber optic line, the optical coupler receiving separate optical wavelength bands from multiple lasers, at least one of the multiple lasers being a tunable laser.

7. An electrical power distribution system, comprising:
a fiber optic line;
multiple power consuming devices; and
multiple control modules interconnected between the fiber optic line and the power consuming devices, each of the control modules being interconnected between the fiber optic line and one of the power consuming devices, and each of the control modules being operative to select the respective power consuming device for supplying electrical power thereto in response to one of multiple optical wavelength bands transmitted through the fiber optic line, each of the optical wavelength bands causing one of the control modules to select the respective power consuming device for supplying electrical power thereto,
the power consuming devices being data storage devices.

8. An electrical power distribution system, comprising:
a fiber optic line;
multiple power consuming devices; and
multiple control modules interconnected between the fiber optic line and the power consuming devices, each of the control modules being interconnected between the fiber optic line and one of the power consuming devices, and each of the control modules being operative to select the respective power consuming device for supplying electrical power thereto in response to one of multiple optical wavelength bands transmitted through the fiber optic line, each of the optical wavelength bands causing one of the control modules to select the respective power consuming device for supplying electrical power thereto,
the power consuming devices being devices having programmed functions, each of the devices performing its respective function in response to electrical power supplied thereto.

9. A well tool control system for selectively supplying electrical power to multiple electrical power consuming well tools in a subterranean well, the system comprising:
a fiber optic line extending in the well;
multiple control modules interconnected to the fiber optic line, each of the control modules including a WDM drop interconnected between the fiber optic line and a respective one of the well tools; and
multiple optoelectric converters, each of the opto-electric converters being interconnected between a respective one of the control modules and the respective one of the well tools, and
wherein each of the control modules is responsive to one of multiple optical wavelength bands transmitted through the fiber optic line to cause light to be transmitted to the respective opto-electric converter and thereby cause electrical power to be supplied to the respective well tool.

10. The system according to claim 9, wherein each of the WDM drops includes an optical circulator and a Bragg grating interconnected to the fiber optic line.

11. The system according to claim 9, wherein each of the control modules includes an optical coupler interconnected to the fiber optic line and an optical filter interconnected between the optical coupler and the power consuming device, the optical filter passing a selected one of the optical wavelength bands.

12. The system according to claim 9, wherein the multiple optical wavelength bands are transmitted singly through the fiber optic line.

13. The system according to claim 9, wherein the multiple optical wavelength bands are transmitted simultaneously through the fiber optic line.

14. The system according to claim 13, further comprising an optical coupler interconnected to the fiber optic line, the optical coupler receiving separate optical wavelength bands from multiple lasers.

15. The system according to claim 9, wherein each of the optoelectric converters is connected to a switch interconnected between at least one power supply and the respective well tool.

16. The system according to claim 15, wherein the switch is a field effect transistor.

17. The system according to claim 9, wherein electrical power is supplied to the selected well tools in a manner which transmits data in a selected one of digital and analog form.

18. A well tool control system for selectively supplying electrical power to multiple electrical power consuming well tools in a subterranean well, the system comprising:
   a fiber optic line extending in the well;
   multiple control modules interconnected to the fiber optic line; and
   multiple opto-electric converters, each of the opto-electric converters being interconnected between a respective one of the control modules and a respective one of the well tools,
   wherein each of the control modules is responsive to one of multiple optical wavelength bands transmitted through the fiber optic line to cause light to be transmitted to the respective opto-electric converter and thereby cause electrical power to be supplied to the respective well tool,
   wherein the multiple optical wavelength bands are transmitted simultaneously through the fiber optic line, and
   further comprising multiple tunable filters and a first optical coupler interconnected to the fiber optic line, the first optical coupler receiving separate optical wavelength bands from the multiple tunable filters.

19. The system according to claim 18, wherein each of the tunable filters is interconnected between the first optical coupler and a second optical coupler, each of the tunable filters receiving a relatively broad optical wavelength band from the second optical coupler.

20. A well tool control system for selectively supplying electrical power to multiple electrical power consuming well tools in a subterranean well, the system comprising:
   a fiber optic line extending in the well;
   multiple control modules interconnected to the fiber optic line; and
   multiple opto-electric converters, each of the opto-electric converters being interconnected between a respective one of the control modules and a respective one of the well tools,
   wherein each of the control modules is responsive to one of multiple optical wavelength bands transmitted through the fiber optic line to cause light to be transmitted to the respective opto-electric converter and thereby cause electrical power to be supplied to the respective well tool,
   wherein the multiple optical wavelength bands are transmitted simultaneously through the fiber optic line,
   further comprising an optical coupler interconnected to the fiber optic line, the optical coupler receiving separate optical wavelength bands from multiple lasers, and
   wherein at least one of the multiple lasers is a tunable laser.

21. A well tool control system for selectively supplying electrical power to multiple electrical power consuming well tools in a subterranean well, the system comprising:
   a fiber optic line extending in the well;
   multiple control modules interconnected to the fiber optic line; and
   multiple opto-electric converters, each of the opto-electric converters being interconnected between a respective one of the control modules and a respective one of the well tools,
   wherein each of the control modules is responsive to one of multiple optical wavelength bands transmitted through the fiber optic line to cause light to be transmitted to the respective opto-electric converter and thereby cause electrical power to be supplied to the respective well tool, and
   wherein the well tools are data storage devices.

22. A well tool control system for selectively supplying electrical power to multiple electrical power consuming well tools in a subterranean well, the system comprising:
   a fiber optic line extending in the well;
   multiple control modules interconnected to the fiber optic line; and
   multiple opto-electric converters, each of the opto-electric converters being interconnected between a respective one of the control modules and a respective one of the well tools,
   wherein each of the control modules is responsive to one of multiple optical wavelength bands transmitted through the fiber optic line to cause light to be transmitted to the respective opto-electric converter and thereby cause electrical power to be supplied to the respective well tool, and
   wherein the well tools are devices having programmed functions, each of the devices performing its respective function in response to electrical power being supplied thereto.

23. A well tool control system for selectively supplying electrical power to multiple electrical power consuming well tools in a subterranean well, the system comprising:
   a fiber optic line extending in the well;
   multiple control modules interconnected to the fiber optic line; and
   multiple opto-electric converters, each of the opto-electric converters being interconnected between a respective one of the control modules and a respective one of the well tools,
   wherein each of the control modules is responsive to one of multiple optical wavelength bands transmitted through the fiber optic line to cause light to be transmitted to the respective opto-electric converter and thereby cause electrical power to be supplied to the respective well tool, and
   further comprising at least one sensor interconnected in the fiber optic line.

24. The system according to claim 23, wherein the sensor includes an intrinsic fiber Bragg grating.

25. The system according to claim 23, wherein there are multiple sensors interconnected in the fiber optic line.

* * * * *